(12) United States Patent
Hagemeister et al.

(10) Patent No.: US 9,469,704 B2
(45) Date of Patent: Oct. 18, 2016

(54) UTILIZATION OF LINEAR ALPHA OLEFINS IN THE PRODUCTION OF METALLOCENE CATALYZED POLY-ALPHA OLEFINS

(75) Inventors: Mark Hagemeister, Houston, TX (US); Anatoly Ilich Kramer, Edison, NJ (US); Pramod Jayant Nandapurkar, Plainsboro, NJ (US); Shakeel Tirmizi, Matawan, NJ (US); Margaret May-Som Wu, Skillman, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1036 days.

(21) Appl. No.: 12/341,830

(22) Filed: Dec. 22, 2008
(Under 37 CFR 1.47)

(65) Prior Publication Data

US 2009/0221775 A1    Sep. 3, 2009

Related U.S. Application Data

(60) Provisional application No. 61/025,200, filed on Jan. 31, 2008.

(51) Int. Cl.
| | | |
|---|---|---|
| *C07C 2/02* | (2006.01) | |
| *C07C 2/04* | (2006.01) | |
| *C07C 2/26* | (2006.01) | |
| *C07C 2/34* | (2006.01) | |
| *C08F 10/14* | (2006.01) | |
| *C08F 10/00* | (2006.01) | |
| C08F 4/659 | (2006.01) | |
| C08F 110/14 | (2006.01) | |
| C08F 210/14 | (2006.01) | |

(52) U.S. Cl.
CPC .............. *C08F 10/14* (2013.01); *C08F 10/00* (2013.01); *C08F 4/65908* (2013.01); *C08F 110/14* (2013.01); *C08F 210/14* (2013.01)

(58) Field of Classification Search
CPC .............. C07C 2/06; C07C 2/04; C07C 9/14
USPC .............................. 526/68, 72; 585/903, 901
See application file for complete search history.

(56) References Cited

U.S. PATENT DOCUMENTS

| | | |
|---|---|---|
| 2,978,442 A | 4/1961 | Brightbill et al. |
| 3,149,178 A | 9/1964 | Hamilton et al. |
| 3,164,578 A | 1/1965 | Baker et al. |

(Continued)

FOREIGN PATENT DOCUMENTS

| | | |
|---|---|---|
| EP | 0 277 004 | 8/1988 |
| EP | 0 277 007 | 8/1988 |

(Continued)

OTHER PUBLICATIONS

English translation of EP680942.*

(Continued)

*Primary Examiner* — David W Wu
*Assistant Examiner* — Elizabeth Eng
(74) *Attorney, Agent, or Firm* — Luke A. Parsons; Leandro Arechederra, III

(57) ABSTRACT

The invention is directed to a process for the preparation of lubricant base stocks by contacting alphaolefin feedstocks with single-site metallocene catalysts and recycling unconverted monomers, characterized by a purge step in the recycle.

20 Claims, 1 Drawing Sheet

(56) References Cited

U.S. PATENT DOCUMENTS

| | | | |
|---|---|---|---|
| 3,382,291 A | 5/1968 | Brennan | |
| 3,742,082 A | 6/1973 | Brennan | |
| 3,769,363 A | 10/1973 | Brennan | |
| 3,780,128 A | 12/1973 | Shubkin | |
| 3,876,720 A | 4/1975 | Heilman et al. | |
| 3,883,417 A * | 5/1975 | Woo et al. | 208/49 |
| 4,016,349 A | 4/1977 | McKenna | |
| 4,132,663 A | 1/1979 | Heilman et al. | |
| 4,149,178 A | 4/1979 | Estes | |
| 4,172,855 A | 10/1979 | Shubkin et al. | |
| 4,180,575 A | 12/1979 | Rochling et al. | |
| 4,239,930 A | 12/1980 | Allphin et al. | |
| 4,263,465 A | 4/1981 | Sheng et al. | |
| 4,263,712 A | 4/1981 | Schroder | |
| 4,367,352 A | 1/1983 | Watts, Jr. et al. | |
| 4,413,156 A | 11/1983 | Watts, Jr. et al. | |
| 4,434,408 A | 2/1984 | Baba et al. | |
| 4,451,684 A | 5/1984 | Pasky | |
| 4,469,912 A | 9/1984 | Blewett et al. | |
| 4,587,368 A | 5/1986 | Pratt | |
| 4,701,489 A | 10/1987 | Hughes et al. | |
| 4,704,491 A | 11/1987 | Tsutsui et al. | |
| 4,713,424 A * | 12/1987 | Brown | 585/424 |
| 4,827,064 A | 5/1989 | Wu | |
| 4,827,073 A | 5/1989 | Wu | |
| 4,892,851 A | 1/1990 | Ewen et al. | |
| 4,910,355 A | 3/1990 | Shubkin et al. | |
| 4,912,272 A | 3/1990 | Wu | |
| 4,914,254 A | 4/1990 | Pelrine | |
| 4,926,004 A | 5/1990 | Pelrine et al. | |
| 4,950,822 A | 8/1990 | Dileo et al. | |
| 4,956,122 A | 9/1990 | Watts et al. | |
| 4,962,262 A | 10/1990 | Winter et al. | |
| 4,967,032 A | 10/1990 | Ho et al. | |
| 4,990,709 A | 2/1991 | Wu | |
| 4,990,771 A | 2/1991 | Minoura et al. | |
| 5,012,020 A | 4/1991 | Jackson et al. | |
| 5,017,299 A | 5/1991 | Gutierrez et al. | |
| 5,017,714 A | 5/1991 | Welborn, Jr. | |
| 5,068,487 A | 11/1991 | Theriot | |
| 5,087,788 A | 2/1992 | Wu | |
| 5,177,276 A | 1/1993 | Beach et al. | |
| 5,186,851 A | 2/1993 | Gutierrez et al. | |
| 5,188,724 A | 2/1993 | Heilman et al. | |
| 5,220,100 A | 6/1993 | Massie et al. | |
| 5,264,642 A | 11/1993 | Wu | |
| 5,369,196 A | 11/1994 | Matsumoto et al. | |
| 5,382,739 A | 1/1995 | Atkins et al. | |
| 5,393,851 A | 2/1995 | Ewen et al. | |
| 5,462,995 A | 10/1995 | Hosaka et al. | |
| 5,498,815 A | 3/1996 | Schaerfl, Jr. et al. | |
| 5,552,504 A | 9/1996 | Bennett et al. | |
| 5,561,092 A | 10/1996 | Ewen et al. | |
| 5,637,400 A | 6/1997 | Brekner et al. | |
| 5,679,812 A | 10/1997 | Winter et al. | |
| 5,688,887 A | 11/1997 | Bagheri et al. | |
| 5,690,832 A | 11/1997 | Tavlarides et al. | |
| 5,731,254 A | 3/1998 | Winter et al. | |
| 5,811,379 A | 9/1998 | Rossi et al. | |
| 5,846,896 A | 12/1998 | Ewen | |
| 5,852,143 A | 12/1998 | Sishta et al. | |
| 5,859,159 A | 1/1999 | Rossi et al. | |
| 6,043,401 A | 3/2000 | Bagheri et al. | |
| 6,087,307 A | 7/2000 | Kaminski et al. | |
| 6,133,209 A | 10/2000 | Rath et al. | |
| 6,147,271 A * | 11/2000 | Strebel et al. | 585/520 |
| 6,180,575 B1 | 1/2001 | Nipe | |
| 6,388,032 B1 | 5/2002 | Yamaura et al. | |
| 6,414,090 B2 | 7/2002 | Minami et al. | |
| 6,414,091 B2 | 7/2002 | Moritomi et al. | |
| 6,479,722 B1 | 11/2002 | De Wet et al. | |
| 6,548,723 B2 | 4/2003 | Bagheri et al. | |
| 6,548,724 B2 | 4/2003 | Bagheri et al. | |
| 6,642,169 B2 | 11/2003 | Weatherhead | |
| 6,646,174 B2 | 11/2003 | Clarembeau | |
| 6,706,828 B2 | 3/2004 | DiMaio | |
| 6,713,438 B1 | 3/2004 | Baillargeon et al. | |
| 6,824,671 B2 | 11/2004 | Goze et al. | |
| 6,858,767 B1 | 2/2005 | DiMaio et al. | |
| 6,960,700 B1 | 11/2005 | Sethna et al. | |
| 7,060,768 B2 | 6/2006 | Brookhart et al. | |
| 7,129,197 B2 | 10/2006 | Song et al. | |
| 7,473,815 B2 | 1/2009 | Lambert et al. | |
| 7,601,256 B2 | 10/2009 | Beall | |
| 2001/0041817 A1 | 11/2001 | Bagheri et al. | |
| 2001/0041818 A1 | 11/2001 | Bagheri et al. | |
| 2003/0055184 A1 | 3/2003 | Song et al. | |
| 2004/0022508 A1 | 2/2004 | Belardi et al. | |
| 2004/0033908 A1 | 2/2004 | Deckman et al. | |
| 2004/0087746 A1 | 5/2004 | Razavi | |
| 2004/0097772 A1 | 5/2004 | Deckers et al. | |
| 2004/0147693 A1 | 7/2004 | DiMaio | |
| 2004/0220359 A1 | 11/2004 | Abhari et al. | |
| 2004/0230016 A1 | 11/2004 | Blackborow et al. | |
| 2005/0059563 A1 | 3/2005 | Sullivan et al. | |
| 2005/0101761 A1 | 5/2005 | Lambert et al. | |
| 2005/0183988 A1 | 8/2005 | Freerks et al. | |
| 2007/0000807 A1 | 1/2007 | Wu et al. | |
| 2007/0011832 A1 | 1/2007 | Keidel et al. | |
| 2007/0043248 A1 | 2/2007 | Wu et al. | |
| 2007/0208151 A1 | 9/2007 | Okada et al. | |
| 2007/0225533 A1 | 9/2007 | Kramer et al. | |
| 2007/0225534 A1 | 9/2007 | Goze et al. | |
| 2007/0225535 A1 | 9/2007 | Yang et al. | |
| 2009/0005279 A1 | 1/2009 | Wu et al. | |
| 2009/0156874 A1 | 6/2009 | Patil et al. | |
| 2009/0281360 A1 | 11/2009 | Knowles et al. | |
| 2010/0069687 A1 | 3/2010 | Kosover et al. | |

FOREIGN PATENT DOCUMENTS

| | | | |
|---|---|---|---|
| EP | 0 284 708 | 10/1988 | |
| EP | 0 321 852 | 6/1989 | |
| EP | 0 349 276 | 1/1990 | |
| EP | 0 377 306 | 7/1990 | |
| EP | 0 403 866 | 12/1990 | |
| EP | 0 513 380 | 11/1992 | |
| EP | 0 613 873 | 9/1994 | |
| EP | 680942 A1 * | 11/1995 | C07C 11/02 |
| EP | 0 930 320 | 7/1999 | |
| EP | 0 992 517 | 4/2000 | |
| EP | 1 028 128 | 8/2000 | |
| EP | 1 309 633 | 5/2003 | |
| EP | 1 342 707 | 9/2003 | |
| EP | 1 607 415 | 12/2005 | |
| GB | 938069 | 9/1963 | |
| IN | 191553 | 12/2003 | |
| JP | 5 087 182 | 7/1975 | |
| JP | 6 263 821 | 9/1994 | |
| JP | 6336590 | 12/1994 | |
| JP | 2005-200446 | 7/2005 | |
| WO | WO 96/23751 | 8/1996 | |
| WO | WO 99/67347 | 12/1999 | |
| WO | 00/58423 | 10/2000 | |
| WO | WO 02/14384 | 2/2002 | |
| WO | 03/009136 | 1/2003 | |
| WO | 03/051943 | 6/2003 | |
| WO | 03/071369 | 8/2003 | |
| WO | 03/104292 | 12/2003 | |
| WO | 2004/046214 | 6/2004 | |
| WO | 2007/011462 | 1/2007 | |
| WO | WO 2007/011459 | 1/2007 | |
| WO | WO 2007/011832 | 1/2007 | |
| WO | WO 2007/011973 | 1/2007 | |
| WO | WO 2007011832 A1 * | 1/2007 | |
| WO | 2007/145924 | 12/2007 | |
| WO | 2007/146081 | 12/2007 | |
| WO | 2008/010865 | 1/2008 | |
| WO | WO 2008/010862 | 1/2008 | |

(56) References Cited

FOREIGN PATENT DOCUMENTS

| WO | 2009/017953 | 2/2009 |
|---|---|---|
| WO | 2009/137264 | 11/2009 |

OTHER PUBLICATIONS

J. Brennan, "*Wide-Temperature Range Synthetic Hydrocarbon Fluids*", Ind. Eng. Chem. Prod. Res. Dev., 1980, vol. 19, pp. 2-6.

K. Denbigh, "*The Kinetics of Continuous Reaction Processes: Application to Polymerization*", J. Applied Chem, 1951, vol. 1, pp. 227-236.

K. Denbigh, "*Continuous Reactions: Part II. The Kinetics of Steady State Polymerisation*", Trans Faraday Soc., 1947, vol. 43, pp. 648-660.

A. Munoz-Escalona et al., "*Single-Site Supported Catalysts for Ethylene Polymerization*", Metallocene Tech., 1999, pp. 2242-2246.

Z. Fan et al., "*Effect of Ethoxy- and Methoxysilane Donors in Propene/1-Hexene Copolymerization With High-Yield Supported Ziegler-Natta Catalysts*", Macromolecular Chemistry and Physics, 1994, vol. 195, pp. 3889-3899.

G. Gokel ed, Dean's Handbook of Organic Chemistry, 2nd Edition, McGraw-Hill, 2004, available on-line at hhtp://knovel.com.

M. LeVan et al. "*Adsorption and Ion Exchange*" Perry's Chemical Engineer's Handbook, 7th ed. 1997 pp. 16-1-16-66.

O. Levenspiel, "*Ch. 7 Design for Multiple Reactions*", Chemical Reaction Engineering, 2nd ed., 1972, pp. 196-209.

N. Naga et al., "*Effect of Co-Catalyst System on a-Olefin Polymerization With Rac- and Meso- [Dimethylsilylenebis(2,3,5-Trimethyl-Cyclopentadienyl)]Zirconium Dichloride*", Macromol. Rapid Commun., 1997, vol. 18, pp. 581-589.

N. Naga et al, "*Polymerization Behavior of a-Olefins With Rac- and Meso-Type Ansa-Metallocene Catalysts: Effects of Cocatalyst and Metallocene Ligand*", Macromolecular Chemistry Physics, 1999, vol. 200, pp. 1587-1594.

F. Rodriguez, "*The Molecular Weight of Polymers*", Principles of Polymer Systems, 1970, Chapter 6, pp. 115-144.

M. Sacchi et al., "*Use of Different Alkoxysilanes As External Donors in $MgCl_2$-Supported Ziegler-Natta Catalysts to Obtain Propene/1-Butene Copolymers With Different Microstructure*", Macromolecular Chemistry and Physics, 1994, vol. 195, pp. 2805-2816.

T. Seraidaris et al., "*High-Molar-Mass Polypropene with Tunable Elastic Properties by Hafnocene/Borate Catalysts*", Journal of Polymer Science: Part A: Polymer Chemistry, 2006, vol. 44, pp. 4743-4751.

J. Wills, "*Synthetic Lubricants*", Lubrication Fundamentals, Marcel Dekker Inc., New York, 1980, pp. 75-80.

"*Mobil Releases SuperSyn PAOs*", Lubrication Engineers, 1999, vol. 55, Part 8, pp. 45.

TIBA data, "*TIBA datasheet*" available on-line at www.albermarle.com on Aug. 26, 2010.

Bolan, R.E., "*Synthetic Lubricant Base Stocks*", SRI International, Report No. 125A, pp. 4-1 through 4-41, Appendix A, Sep. 1989.

\* cited by examiner

UTILIZATION OF LINEAR ALPHA OLEFINS IN THE PRODUCTION OF METALLOCENE CATALYZED POLY-ALPHA OLEFINS

PRIORITY CLAIM

This application claims priority to and the benefit of U.S. Ser. No. 61/025,200, filed Jan. 31, 2008.

FIELD OF THE INVENTION

The invention relates to the production of polyalphaolefins (PAO) using metallocene catalysts.

BACKGROUND OF THE INVENTION

Efforts to improve on the performance of natural mineral oil-based lubricants by the synthesis of oligomeric hydrocarbon fluids have been the subject of important research and development in the petroleum industry for at least fifty years. These efforts have led to the relatively recent market introduction of a number of synthetic lubricants.

In terms of lubricant property improvement, the thrust of industrial research efforts involving synthetic lubricants has been towards fluids exhibiting useful viscosities over a wide temperature range, i.e., improved viscosity index (VI), while also showing lubricities, thermal stabilities, oxidative stabilities and pour points equal to or better than those for mineral oil.

The viscosity-temperature relationship of a lubricating oil is one of the main criteria considered when selecting a lubricant for a particular application. The mineral oils, commonly used as a base for single and multi-grade lubricants, exhibit a relatively large change in viscosity with a change in temperature. Fluids exhibiting such a relatively large change in viscosity with temperature are said to have a low viscosity index (VI). VI is an empirical number which indicates the rate of change in the viscosity of an oil within a given temperature range. A high VI oil, for example, will thin out at elevated temperatures more slowly than a low VI oil. Usually, a high VI oil is more desirable because it has relatively higher viscosity at higher temperature, which translates into better lubrication and better protection of the contacting machine elements, preferably at high temperatures and or at temperatures over a wide range. VI is calculated according to ASTM method D 2270.

PAOs comprise a class of hydrocarbons manufactured by the catalytic oligomerization (polymerization to low-molecular-weight products) of linear α-olefin (LAO) monomers. These typically range from 1-octene to 1-dodecene, with 1-decene being a preferred material, although oligomeric copolymers of lower olefins such as ethylene and propylene may also be used, including copolymers of ethylene with higher olefins as described in U.S. Pat. No. 4,956,122 and the patents referred to therein.

PAO products have achieved importance in the lubricating oil market. Typically there are two classes of synthetic hydrocarbon fluids (SHF) produced from linear alpha-olefins, the two classes of SHF being denoted as PAO and HVI-PAO (high viscosity index PAO's). PAO's of different viscosity grades are typically produced using promoted $BF_3$ or $AlCl_3$ catalysts.

Specifically, PAOs may be produced by the polymerization of olefin feed in the presence of a catalyst such as $AlCl_3$, $BF_3$, or promoted $AlCl_3$, $BF_3$. These catalysts show reactivity toward branched olefins but exhibit higher reactivity toward alpha-olefins. When oligomerizing a feed of linear alpha-olefins with these catalysts, a process-generated side stream of unreacted monomers is produced. Recycling these unreacted monomers is considered disadvantageous because they contain branched or internal olefins which typically are not desired in the production of conventional PAOs since they have adverse effect on final PAO product properties.

Processes for the production of PAOs using metallocene catalysts in the oligomerization of various alpha olefin feeds has been previously disclosed such as in WO 2007-011832, WO 2007-011459, WO 2007-011973, and WO 2008-010862 all of which provide additional background explicitly or through citation of references, for the present invention. Ideally, it is desirable to convert all the alpha-olefin feeds into lube products. However, sometimes, in order to optimize reactor efficiency and reactor capacity, it is desirable to keep the reaction at partial olefin conversion, less than 100% alpha-olefin conversion. Typically the amount of alpha-olefin monomer converted into lubricant-range (C30-C60) polyalphaolefins is less than 80 mol %.

One of the most pressing problems in the industry is availability and cost of feedstock alpha-olefins. The availability of the feed alpha-olefins has been a challenge for the past several years. Although 1-decene is the most desirable feed, and there have been many efforts to mimic the excellent properties of 1-decene oligomers by varying or supplementing the feedstock with other alpha-olefin monomers. The main problem in using alternative feedstocks, e.g., feedstocks based on one or more of C3-C18 alphaolfins, has been to achieve the same properties in the final PAO as achieved by a pure 1-decene feedstock. See, for instance, Published Application Nos. US2007-0225533, US2007-0225534, US2007-0225535 However, even these alternative feedstocks have become scarce. Thus, improved utilization of all feedstocks in PAO oligomerization processes is an area of continued active research.

Additionally, performance requirements of lubricants are becoming increasingly stringent. New PAOs with improved properties, such as high viscosity index (VI), low pour point, reduced volatility, high shear stability, narrow molecular weight distribution, improved wear performance, increased thermal stability, oxidative stability, and/or wider viscosity range, are needed to meet new performance requirements for lubricants. New methods to provide such new PAOs with improved properties are also needed.

Prior specific efforts to prepare various PAOs using particular metallocene catalyst systems include U.S. Pat. No. 6,706,828, where PAOs are produced from meso-forms of certain metallocene catalysts, such as rac-dimethylsilylbis (2-methyl-indenyl)zirconium dichloride in combination with methylalumoxane (MAO) at 100° C. in the presence of hydrogen to produce polydecene; WO 02/14384, which discloses, among other things, in examples J and K the use of rac-ethyl-bis(indenyl)zirconium dichloride or rac-dimethylsilyl-bis(2-methyl-indenyl)zirconium dichloride in combination with MAO at 40° C. (at 200 psi hydrogen or 1 mole of hydrogen) to produce isotactic polydecene reportedly having a Tg of −73.8° C., a $KV_{100}$ of 702 cSt, and a VI of 296; or to produce polydecene reportedly having a Tg of −66° C., a $KV_{100}$ of 1624, and a VI of 341, respectively; and WO 99/67347, which discloses, for example, in Example 1 the use of ethylidene bis(tetrahydroindenyl)zirconium dichloride in combination with MAO at 50° C. to produce a polydecene reportedly having an $M_n$ of 11,400 and 94% vinylidene double bond content.

PAOs have also been made using metallocene catalysts not typically known to produce polymers or oligomers with any specific tacticity. Examples include WO 96/23751, EP 0

613 873, U.S. Pat. No. 5,688,887, U.S. Pat. No. 6,043,401, WO 03/020856 (equivalent to US 2003/0055184), U.S. Pat. No. 5,087,788, U.S. Pat. No. 6,414,090, U.S. Pat. No. 6,414,091, U.S. Pat. No. 4,704,491, U.S. Pat. No. 6,133,209, and U.S. Pat. No. 6,713,438.

Additionally, U.S. Pat. Nos. 6,548,723 and 6,548,724 disclose production of oligomer oils using certain metallocene catalysts, typically in combination with methyl alumoxane. In column 20, lines 40 to 44 of U.S. Pat. No. 6,548,724, Examples 10-11 indicate that di-, tri-, or tetra-substitutions on the cyclopentadienyl rings of the metallocenes are useful for production of high viscosity index polyalphaolefins, (in the range of 20 to 5000 cSt at 100° C.) with improved yields whereas penta-alkyl-substituted cyclopentadienyl rings are poor." Further examples 12 and 13 show production of polydecenes in the absence of hydrogen with reported KV100's of 154 and 114.6. Additionally Examples 14—discloses polymerization of decene with $Cp_2ZrMe_2$ or $(iPr-Cp)_2ZrCl_2$ with N,N-dimethylanalinium tetra(phenyl)borate at 100° C. or 110° C. to produce polydecenes with reported KV100's of from 5.3 to 11.4 cSt.

In other examples, PCT/US06/21231 and WO2007011459 A1 describes the production of liquids from monomers having 5 to 24 carbon atoms using metallocenes and non-coordinating anion activators, and WO2007011973 A1 describes the production of low viscosity liquids from alpha-olefins using metallocenes.

In many of the process of PAO's made with metallocenes, it is important to fully utilize the alpha-olefins feeds to obtain the optimized process economics.

In particular, what is needed is a process generally applicable to various metallocene catalyst with high efficiency using a diverse monomer feedstock to consistently produce lube base stocks of highest quality.

The present inventors have surprisingly discovered that under appropriate process conditions unreacted monomers generated during the oligomerization of alpha-olefins could be recycled back into the process without any adverse effect on the properties of final product by optionally maintaining a partial purge of these recycled monomers. Thus improved utilization of olefin feed will be achieved and, even more surprisingly, certain important characteristics of the PAO product, such as at least one of Molecular Weight Distribution, Noack Volatility, and Shear Stability, are either equivalent to or even improved from the same process using fresh feed. This is an extremely important result given the current shortage of traditional feedstocks.

SUMMARY OF THE INVENTION

The invention is directed to a continuous, batch, or semi-batch process for the preparation of poly-alpha-olefins (PAOs) in the presence of a metallocene catalyst with a non-coordinating anion activator, the improvement comprising the use of recycled unconverted monomer feed including optional purge of a portion of the recycled unconverted monomer.

In embodiments, the process of the invention comprises the use of one or more monomers selected from C4 to C18 alpha-olefins as monomer feed.

In other embodiments, there is a product, and a process for producing said product, suitable for lubricant bases stocks and having at least one of a molecular weight distribution (MWD), Noack Volatility, and Shear Stability the same or better than what is achieved by the same process under the same conditions but without the use of a recycled unconverted monomer or with the use of recycled unconverted monomer and with optional purge of the recycled monomer.

It is an object of the invention to provide a process for the production of PAOs with better utilization of available feedstocks, and more particularly to produce lubricant range PAOs having a carbon number of from C30 to C60.

It is an object of the invention to provide a process of making PAOs with tailored properties using monomers selected from C4 to C16 alpha-olefins, particularly properties selected from molecular weight distribution (MWD), Noack Volatility, and Shear Stability, and combinations thereof.

It is another object of the invention to provide a process of making PAOs having the same or similar characteristics as PAOs using pure 1-decene feed but with at least one improvement selected from milder conditions, improved molecular weight distribution, improved Noack volatility, improve Shear Stability, and improved utilization of monomer feedstock.

These and other objects, features, and advantages will become apparent as reference is made to the following detailed description, preferred embodiments, examples, and appended claims.

DETAILED DESCRIPTION OF THE INVENTION

According to the invention, poly-alpha-olefins (PAOs) are produced by a process comprising contacting a metallocene catalyst in the presence of a non-coordinating anion (NCA) and co-activator and/or scavenger with a monomer feed comprising alpha-olefins, to obtain a product comprising PAOs and unreacted monomer feed, a step of recycling the monomer feed, and optionally including a step of purging a portion of the recycled monomer feed so that only a portion of the recycled monomer feed is included with fresh monomer feed.

In embodiments, the feed is selected from one or at least one of C4 to C18 alpha-olefin monomers. In preferred embodiments the feed is selected from at least two different monomers selected from C6 to C16 alpha-olefin monomers. In another preferred embodiment the feed is selected from at least three different monomers selected from C6 to C16 alpha-olefin monomers.

In embodiments, lubricant-range bases stocks are obtained having at least one of similar or narrower MWD, similar or improved shear stability, and similar or improved pour point, when compared with lubricant-range base stocks made by the same process without partial monomer recycle. In other embodiments, lubricant-range bases stocks are obtained having at least one of similar or narrower MWD, similar or improved shear stability, and similar or improved pour point, when compared with lubricant-range base stocks made by the same process with complete or partial monomer recycle.

In preferred embodiments, single-site metallocene catalysts are contacted with a feedstock in a batch, semi-batch operation or in a Continuous Stirred Tank Reactor (CSTR) operation to prepare high viscosity index lubricant-range PAO base stocks.

By "high-viscosity index PAO" or HVI-PAO is meant poly-alpha-olefins having a $KV_{100}$ of greater than 3 cSt to about 10,000 cSt.

In embodiments, lubricant base stocks are obtained having at least one of narrow MWD and improved shear stability.

The invention may be better understood by reference to the drawings.

Figure 1:
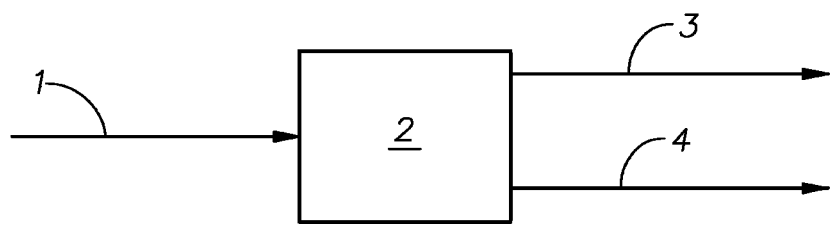
FIG. 1 illustrates schematically the process of feeding alpha-olefin feed in a reactor system without recycle of unconverted monomers.

FIG. 1 illustrates schematically the process of feeding alpha-olefin feed in a reactor, such as a CSTR system, without recycle of unconverted monomers. Conversion of olefin feed in the polymerization reactor using a catalyst system according to the invention is ~78%. As shown in Example 6 below, 100 lbs of fresh alpha-olefin feed can be used to make ~78 lbs of 150 cSt PAO product by the scheme illustrated in this figure. Olefin utilization in this case is ~78%.

Figure 2:
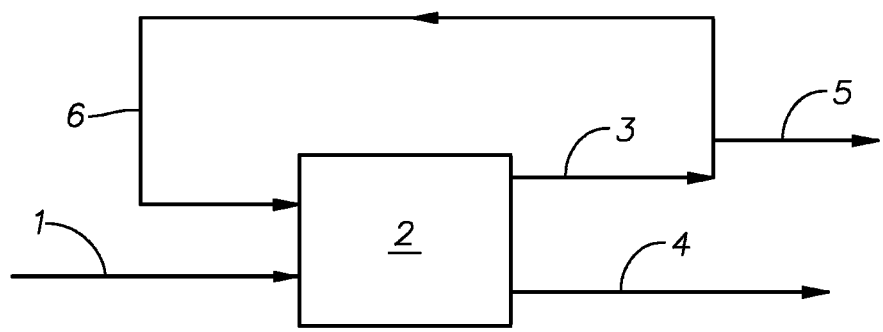
FIG. 2 illustrates schematically the process of feed alpha-olefins in reactor system where unconverted monomers are recycled back into the system in combination with a purge of unconverted monomers from the recycle stream.

FIG. 2 illustrates schematically the process of feed alpha-olefins in the same reactor, e.g., a CSTR system where unconverted monomers are recycled back into the system and optionally in combination with a purge of unconverted monomers from the recycle stream. In this example conversion of combined olefin feed, fresh alpha-olefin feed and recycled unconverted monomers, is ~69%. Using ~12 wt % (~5 lbs) purge of unconverted monomers, the remaining ~88 wt % of unconverted monomers are recycled back into the system. As shown in Example 7 below, 100 lbs of fresh alpha-olefin feed results in ~95 lbs of 150 cSt PAO product.

These two drawings illustrate improvement in utilization of fresh alpha-olefin feed from ~78% to ~95%.

Continuous Stirred Tank Reactors

Continuous Stirred Tank Reactors (CSTR) are per se well-known. The effects of reactor design and operation on molecular weight distribution was studied previously, but there is no simple conclusion how reactor operation will effect MWD, as discussed in *J. Applied Chem.*, 1, 227 [1951]. Other discussion of CSTR operation and other reactor operation can be found in Perry's Chemical Engineers' Handbook, 7th Ed. 23-36 CHEMICAL REACTORS, or K. G. Denbigh, Trans. Faraday Soc, 43, 648 (1947) or Levenspiel, Chemical Reaction Engineering, 2nd ed., 1972 John Wiley and Sons. p. 196.

In semi-batch operation mode or in Continuous Stirred Tank Reactor (CSTR) operation the reaction can be conducted at a polymerization temperatures ranging from 0° C. to 200° C., residence time can be varied between 1 min to 20 hrs. Metallocene loading ranging from 1 g of catalyst per 1,000 g of olefins to 1 g of catalyst per 600,000 g of alpha olefins. Operating pressure can range from atmospheric to 500 psig. Optionally, hydrogen partial pressure can range from 1 psi to 200 psi. In embodiments, the operating conditions are: polymerization temperature: 40 to 150° C., residence time: 1 hour to 4 hour, catalyst loading 1 g per 10,000 g to 500,000 g of the feed olefins. Operating pressure: atmospheric to 500 psig.

Feedstocks

PAOs comprise a well-known class of hydrocarbons manufactured by the catalytic oligomerization (polymerization to low-molecular-weight products) of linear α-olefin (LAO) monomers. Useful in the process of the invention are alpha-olefins ranging from 1-butene to 1-octadecene, and mixtures thereof.

In preferred embodiments the process utilizes mixed alpha-olefins (i.e., at least two different alpha-olefins, or at least three different alpha-olefins) as a feed, however the use of a single alpha-olefin, including the use of only 1-decene, is also possible. In preferred embodiments, the feeds includes at least one or two alpha-olefin monomers selected from 1-butene, 1-hexene, 1-octene, 1-decene, 1-dodecene, 1-tetradecene, 1-hexadecene, 1-octadecene.

Particularly advantaged feedstocks include those C4-C18 alpha-olefin sources described in WO2007/011832, e.g., alpha-olefins derived from an ethylene growth process, from Fischer-Tropsch synthesis, from steam or thermal cracking processes, syn-gas synthesis, C4 stream containing 1-butene from refinery operation, such as Raff-1 or Raff-2 stream, and so forth.

Catalyst System

The catalyst system comprises a metallocene compound together with the activator. The catalyst may be bridged or unbridged, and it may be meso-, racemic- or metallocenes containing other symmetry groups. For the purpose of the present invention, the term "catalyst system" includes the single site metallocene catalyst and activator pair. When "catalyst system" is used to describe such a pair before activation, it means the unactivated catalyst (precatalyst) together with an activator and, optionally, a co-activator (such as a trialkyl aluminum compound). When it is used to describe such a pair after activation, it means the activated catalyst and the activator or other charge-balancing moiety. Furthermore, this activated "catalyst system" may optionally comprise the co-activator and/or other charge-balancing moiety.

Single Site Metallocene Catalysts

Catalysts suitable for the process of the present invention include single-site metallocene catalyst systems, such as described in WO2007/011832, WO2007/011459, WO2007/011973. The preferred metal is selected from Group 4 transition metals, preferably zirconium (Zr), hafnium (Hf) and titanium (Ti).

Preferred single-site catalysts for the present invention include catalysts such as rac-dimethyl-silyl-bis(4,5,6,7-tetrahydroindenyl)zirconium dichloride or rac-dimethyl-silyl-bis(4,5,6,7-tetrahydroindenyl)zirconium dimethyl, rac-dimethyl-silyl-bis(indenyl)zirconium dichloride or rac-dimethyl-silyl-bis(indenyl)zirconium dimethyl, rac-ethylidene-bis(4,5,6,7-tetrahydroindenyl)zirconium dichloride or rac-ethylidene-bis(4,5,6,7-tetrahydroindenyl) zirconium dimethyl, rac-ethylidene-bis(indenyl)zirconium dichloride or rac-ethylidene-bis(indenyl)zirconium dimethyl, meso-dimethyl-silyl-bis(4,5,6,7-tetrahydroindenyl) zirconium dichloride or meso-dimethyl-silyl-bis(4,5,6,7-tetrahydroindenyl)zirconium dimethyl, meso-dimethyl-silyl-bis(indenyl)zirconium dichloride or meso-dimethyl-silyl-bis (indenyl)zirconium dimethyl, meso-ethylidene-bis(4,5,6,7-tetrahydroindenyl)zirconium dichloride or meso-ethylidene-bis(4,5,6,7-tetrahydroindenyl)zirconium dimethyl, meso-ethylidene-bis(indenyl)zirconium dichloride or meso-ethylidene-bis(indenyl)zirconium dimethyl. Other preferred single-site catalysts include the aforementioned racemic or meso catalysts with different degree of substituted indenyl ligands.

Other preferred metallocenes include the unbridged metallocenes such as bis(cyclopentadienyl)zirconium dichloride, bis(cyclopentadienyl)zirconium dimethyl, bis(1,2-dimethylcyclopentadienyl)zirconium dichloride, bis(1,2-dimethylcyclopentadienyl)zirconium dimethyl, bis(1,3-dimethylcyclopentadienyl)zirconium dichloride, bis(1,3-dimethylcyclo-pentadienyl)zirconium dimethyl, bis(1,2,3-trimethylcyclopentadienyl)zirconium dichloride, bis(1,2,3-trimethylcyclopentadienyl)zirconium dimethyl, bis(1,2,4- trimethylcyclopentadienyl)zirconium dichloride, bis(1,2,4-trimethylcyclopentadienyl)zirconium dimethyl, bis(1,2,3,4-tetramethylcyclopentadienyl)zirconium dichloride, bis(1,2,3,4-tetramethylcyclopentadienyl)zirconium dimethyl, bis(pentamethylcyclo-pentadienyl)zirconium dichloride, bis(pentamethyl-cyclopentadienyl)zirconium dimethyl, and other substituted analogs.

Activator

The activator may be a non-coordinating anion (NCA) activator or a trialkyl aluminum compound such as methylaluminoxane (MAO). For purposes of this invention and the claims thereto noncoordinating anion (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the noncoordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms ionic activator, and stoichiometric ionic activator can be used interchangeably. Likewise, the terms neutral stoichiometric activator and Lewis acid activator can be used interchangeably.

The preferred activator for the present invention is an NCA, preferably such as one described in U.S. Pat. No. 7,279,536, or as described in WO2007/011832. These activators are per se well-known.

The more preferred NCA is $C_{32}H_{12}BF_2$ 2ON (n,n-dimethylanilinium tetrakis(penta-fluorphenyl)borate.

Usually, the catalyst system also includes a co-activator, which is usually a trialkylaluminum compounds. This trialkyl aluminum compounds can also be used effectively as a impurity or poison scavenger for the reactor system. Most preferred trialkyl aluminum compounds are tri-isobutylaluminum, tri-n-octylaluminum or tri-n-hexylaluminum or tri-n-decylaluminum, tri-n-octylaluminum, etc.

Other components used in the reactor system can include inert solvent, catalyst diluent, etc. These components can also be recycled during the operation Lube Product Isolation When the polymerization or oligomerization reaction is progressed to the pre-determined stage, such as 70 or 80% or 90% or 95% alpha-olefin conversion, the reactor effluent is withdrawn from the reactor. Usually the reaction product should be treated in the same manner as described in U.S. Patent Application Publication No. 2008/0020928 (having a priority date of Jul. 19, 2006; U.S. Provisional Application No. 60/831,995). In the preferred manner, the catalyst should be deactivated by introduction of air, $CO_2$ or water or other deactivator to a separate reaction vessel. The catalyst components can be removed by methods described in the aforementioned U.S. Patent Application Publication No. 2008/0020928 or by washing with aqueous base or acid followed by separating the organic layer as in conventional catalyst separation method. After the catalyst removal, the effluent can be subjected to a distillation to separate the un-reacted feed olefins, inert solvents and other lighter components from the heavier oligomerization product. Depending on the polymerization reaction conditions, this oligomerization product may have high degree of unsaturation as measured by bromine number (ASTM D1159 method or equivalent method). If the bromine number is judged too high, the heavy oligomer fraction is subjected to a hydrofinishing step to reduce the bromine number, usually to less than 3 or less than 2 or less than 1, depending on hydrofinishing conditions and the desired application of the PAO base stock. Typical hydrogenation step can be found in many published patents and literatures of PAO production process. Sometimes, when the PAO products have very high molecular weight or hydrogen is used during the polymerization step, the isolated PAO products will naturally have very low bromine number or degree of unsaturation, the product can be used directly in many applications without a separate hydrogenation step.

The light fraction, as separated directly from the reactor effluent or further fractionated from the light fraction contains un-converted alpha-olefins. This light fraction can be recycled with or without any purge, into the polymerization reactor for further conversion into lube product. Or, this fraction as is, or the appropriated fractions, can be recycled into the polymerization reactor, after passing through a feed pre-treatment column containing the typical polar component removing agent, such as activated alumina, molecular sieve, or other active sorbents. This pre-treatment column can remove any of the impurity from the catalyst residual or other impurities. Alternatively, this fraction can be combined with fresh feed olefins before feed purification column.

Recycled Feed Olefin Stream

The amount of the fraction containing the un-reacted olefins from the reactor effluent ranges from 1% to 70% of the fresh feed olefins, depends on conversion, the amount of inert components and solvents used in the reaction. Usually this amount ranges from 5% to 50% and more commonly, from 5% to 40% of the fresh feed olefin. This fraction containing the un-reacted olefins can be recycled into the polymerization reactor in 100% or sometimes only part of the fraction, ranging from 99% to 20%, alternatively 95% to 40%, or alternatively 90% to 50%, is re-cycled into the polymerization reactor. The amount of this fraction to be recycled depends on the composition of the fraction, how much inert components or solvents the polymerization reactor can tolerate. Usually, the higher the amount of recycle, the better the total lube yields and better alpha-olefin usage and better process economics.

The fraction containing the un-reacted olefins from the reactor effluent can be recycled into the polymerization reactor by itself, or more commonly, the un-reacted olefins fraction is co-fed into the polymerization reactor with some fresh alpha-olefins. The weight % of the recycled un-reacted olefin fractions in the total feed ranges from 0% to 100%. More commonly, the weight % of ranges from 0.1% to 70%, or alternatively 0.5% to 50% or alternatively, 1% to 30%. Or during a continuous operation, this weight % can change depending on selected degree of conversion, product viscosity, degree of purge stream, etc. Sometimes when making high viscosity product, higher percentage of the recycled stream is used to reduce reactor viscosity and enhance reactor control.

The fraction containing the un-reacted olefins usually contains the feed alpha-olefins, internal olefins or di- or tri-substituted olefins, small oligomers of the starting alpha-olefins and other inert components, such as solvents and diluents, etc. In this recycled stream, the amount of internal olefins, di-, tri-substituted olefins, solvents and diluents are usually in higher concentration than the fresh feed olefins. In other words, the amount of reactive alpha-olefins is usually lower than the fresh feed olefins. The amount of alpha-olefins can range from 2% to 80% and usually is not more than 70%. However, surprisingly, we found that this fraction containing low amount of alpha-olefins can be converted into high quality lube base stock in the similar manner as the fresh feed over the metallocene catalyst with high lube yields and high catalyst productivity. Furthermore, the product property from this recycled olefin stream or the mixture of recycled olefin stream with fresh feed, are similar to 100% fresh feed or in some cases, product can advantageously have lower viscosity.

PAO Products from Recycled Olefin Feeds

The PAO products produced from recycled olefins, by itself or in combination with fresh alpha-olefins, have same chemical compositions and structures as the products produced from fresh olefin feeds of comparable alpha-olefin compositions. Most importantly, the PAO products from the feeds containing recycled olefins have substantially head-to-tail connections in the oligomers and substantially absent of any branches resulting from the isomerization of the carbon skeletons of the alpha-olefins or the isomerization of the double bonds of the alpha-olefins in the feed stream. Furthermore, the molecular weight distributions (MWD) of the PAO products from feeds containing recycled olefins are also very narrow, comparable to the MWD of the PAO products made from fresh alpha-olefins of same compositions under similar conditions. Detailed description of the PAO product compositions can be found in these published patents, WO2007/011832, WO21007/011459, WO2007/011973. Sometimes, the viscosity of the lube fractions produced from feeds containing significant amount of recycled olefins, up to 100%, have slightly lower viscosity than lube fractions from fresh alpha-olefin feeds under the identical reaction conditions. This is advantageous if lower viscosity product is more desirable. If same viscosity product is more desirable, the reaction temperature, amount of solvent or diluent used in the reactor system can be adjusted to achieve identical viscosity. These adjustments can be made in the operation without more than routine experimentation by one of ordinary skill in the art in possession of the present disclosure.

The PAO products produced from feed stream containing recycled olefins have comparable VI, pour points, thermal oxidative stability, shear stability any industrial standard typical shear stability tests, and other advantageous properties as PAO produced from fresh olefin feeds of comparable compositions. Generally, these PAOs will have a shear viscosity loss of significantly less than 10%, preferably less than 5%, less than 3% or less than 2%, as tested by TRB test as described herein. This is quite unexpected considering the different chemical composition of recycled olefins from the fresh olefins.

EXPERIMENTAL

The invention may be better understood, and additional benefits to be obtained thereby realized, by reference to the following examples. These examples should be taken only as illustrative of the invention rather than limiting, and one of ordinary skill in the art in possession of the present disclosure would understand that numerous other applications are possible other than those specifically enumerated herein.

The shear stability data (TRB test) were generated at SouthWest Research Institute in San Antonio, Tex., using the procedure described in CEC L-45-A-99. During this test, the oil is tested in a tapered roller bearing fitted into a Four-Ball EP test machine. The taper roller bearing, submerged in 40 ml of test fluid, was rotated at 1475 rpm with a load of 5000 Newton at 60° C. for a standard duration of 20 hours. When the test is completed, the used fluid viscosity is measured and % viscosity loss was calculated from the sample viscosity before and after the test. The severity of the TRB test can be increased by extending the test duration up to 100 or 200 hours. The standard test duration of 20 hours is perfectly suitable to differentiate and rank the shear stability of wide range of lubricants. Although the majority of products are tested by using a test duration of 20 hrs, metallocene catalyzed PAOs were also tested at 100 hrs.

Molecular weight distribution (MWD), defined as the ratio of weight-averaged MW to number-averaged MW (=Mw/Mn), was determined by gel permeation chromatography (GPC) using polymers with known molecular weights as calibration standards, as described in p. 115 to 144, Chapter 6, The Molecular Weight of Polymers in "Principles of Polymer Systems" (by Ferdinand Rodrigues, McGraw-Hill Book, 1970).

Examples 1 to 3

This set of experiments was carried out in a continuous reactor mode. These runs produced PAO products with narrow molecular weight distribution, and demonstrated the use of non-coordinating anion (NCA) as activator, and high lube yields. Olefins used in these runs were purified through a 3-5 Angstrom molecular sieve.

The metallocene catalyst used was dimethylsilylbis[tetrahydroindenyl]zirconium dimethyl and the activator used was N,N-dimethylanilinium tetra(pentafluorophenyl)borate.

A catalyst solution was prepared by pre-mixing metallocene catalyst with the activator in toluene solution to give 0.0025 g of catalyst per 1 gram of solution. The experiments were conducted in a single CSTR system. The size of autoclave reactors used in these experiments were 1-liter to 2-gallons. All feeds were introduced into the CSTR continuously at fixed rates. CSTR was controlled at a given reaction temperature. The catalyst solution, a scavenger tri-n-octylaluminum (TNOA) solution, and purified olefin feed were continuously pumped into the CSTR maintained at reaction temperature. Reaction product was continuously withdrawn from the autoclave, quenched with water, and filtered. The quenched PAO product was further distilled at high temperature to remove any C24 and lighter components, and then filtered. The residual oil was then hydrogenated using 1 wt % Ni-on-Kieselguhr catalyst at 200° C.-232° C., 650 to 800 psi (5.5 MPa) hydrogen pressure for 2 to 4 hours. The bromine numbers for all samples after hydrogenation were below 1. The reaction conditions and the hydrogenated finished lube properties are summarized in the following Table 1. This set of data demonstrates that a wide range of alpha olefins can be used to produce PAO with nearly identical properties. This data further demonstrated that the MWD of the lube products as analyzed by GPC were all very narrow. The data in Table 1 also demonstrate low utilization (~78% conversion) of the olefin feed in once through process.

TABLE 1

CSTR Processing with Various Fresh Olefin Feeds

| Example No. | 1 | 2 | 3 |
|---|---|---|---|
| Olefin Feed | $C_6/C_{10}/C_{14}$ 25 wt %/60 wt %/ 15 wt % | 100% $C_{10}$ | $C_8/C_{12}$ 80 wt %/ 20 wt % |

TABLE 1-continued

CSTR Processing with Various Fresh Olefin Feeds

| Example No. | 1 | 2 | 3 |
|---|---|---|---|
| Reaction Temperature, °C. | 60 | 60 | 59 |
| Feed Rates | | | |
| Olefins, g/min | 35 | 30 | 35 |
| metallocene, g/min | 4.2E−04 | 1.1E−03 | 4.2E−04 |
| activator, g/min | 8.0E−04 | 2.0E−03 | 8.0E−04 |
| Scavenger TNOA, g/min | 1.0E−02 | 2.8E−07 | 1.0E−02 |
| Metallocene catalyst loading, g olefin feed/g catalyst | 84,000 | 30,000 | 84,000 |
| Residence Time, hrs | 3 | 1 | 3 |
| % Conversion | 78 | 81.4 | 80 |
| % Lube Selectivity | ~98 | ~97 | ~98 |
| Hydrogenated Lube Property | | | |
| KV@100° C., cSt | 154.0 | 169.1 | 148.0 |
| KV@40° C., cSt | 1678 | 1617 | 1540 |
| VI | 206 | 225 | 208 |
| PP | −33 | −30 | −33 |
| Molecular Wt by GPC | | | |
| Mn | 4245 | 4537 | 3780 |
| Mw | 7498 | 7579 | 6540 |
| MWD | 1.76 | 1.67 | 1.73 |

The examples 4 and 5 in accompanying Table 2 demonstrate improvement in feed utilization via recycling of unconverted monomers. The data in example 4 was obtained without 1-decene recycle. The unconverted monomer generated in example 4 was mixed with fresh feed (75 parts of fresh feed and 25 parts of recycled monomer) and oligomerized under identical conditions. The results are shown as example 5 in Table 2. These examples demonstrate that both PAO products have nearly identical physical properties and the feed utilization is improved with the use of recycled monomers from 76% to 85%.

TABLE 2

CSTR Processing with Recycle

| | Example No. | |
|---|---|---|
| | 4<br>100% Fresh Feed | 5<br>75% Fresh Feed/<br>25% Recycled |
| Reaction Temperature, °C. | 59 | 59 |
| Feed Rates | | |
| 1-decene, g/min | 35 | 35 |
| Metallocene, g/min, | 4.2E−04 | 4.2E−04 |
| activator, g/hr | 8.0E−04 | 8.0E−04 |
| Scavenger TNOA, g/min | 1.0E−02 | 1.0E−02 |
| Metallocene catalyst loading, g feed/g catalyst | 84,000 | 84,000 |
| Run Time, hrs | 4 | 4 |
| % Conversion | 75.9 | 76.4 |
| % Lube Selectivity | ~98 | ~98 |
| % Olefin Utilization | 75.9 | 85.0 |
| Hydrogenated Lube Property | | |
| KV@100° C., cSt | 126.8 | 121.4 |
| KV@40° C., cSt | 1165 | 1096 |
| VI | 215 | 215 |
| PP | −33 | −33 |

To further demonstrate the recyclability of unconverted monomers and to simulate the operation of a commercial plant where the unconverted monomers are continuously recycled, single CSTR laboratory experiments were conducted using a blended feed containing C6/C10/C14 alpha-olefins.

With continuous recycling of unconverted monomers the amount of inerts (non-alpha olefins components in the feed) present in the feed builds up. During these experiments it was surprisingly discovered that reduction in polymerization temperature allows to overcome the adverse effect of inerts buildup. It was discovered that in case of monomer recycle reduction of polymerization temperature is needed to obtain proper product viscosity. These findings are shown in Table 3 (examples 6 and 7).

TABLE 3

CSTR Processing of $C_6/C_{10}/C_{14}$ Mixed Olefin Fresh and Recycled Feeds

| Example # | 6 | 7 |
|---|---|---|
| Feed | Fresh Feed<br>$C_6/C_{10}/C_{14}$<br>25 wt %/60 wt %/<br>15 wt % | Recycled monomers from<br>Example 6<br>70% Fresh Feed/<br>30% Recycle |
| Reaction Temperature, °C. | 60 | 57 |
| Reaction Time, hrs | 3.0 | 3.0 |
| Olefin Feed Rate, g/min | 35 | 35 |
| Metallocene Catalyst Loading, g of feed/g of cat | 84,000 | 84,000 |
| % Conversion | 78.0 | 71.0 |
| % Lube Selectivity | ~98 | ~98 |
| Olefin Utilization, % | ~78 | ~93 |
| Hydrogenated Lube Property: | | |
| KV@100° C., cSt | 154 | 151 |
| KV@40° C., cSt | 1678 | 1650 |
| VI | 206 | 204 |
| PP | −33 | −33 |
| GPC | | |
| Mw | 7498 | 7620 |
| Mn | 4245 | 4280 |
| Mw/Mn | 1.76 | 1.78 |
| Shear Stability:<br>CEC L-45-A-99<br>Taper Roller Bearing<br>(@ 100 hrs) | | |
| KV@100 C., cSt (before test) | 151.36 | 152.33 |
| KV@100 C., cSt (after test) | 151.25 | 152.51 |
| Vis Change, cSt | 0.11 | −0.19 |
| % 100° C. Loss | 0.07 | −0.12 |

These examples also demonstrate that olefin utilization is improved from ~78% in case of fresh feed to around ~93% in case with recycle of unconverted monomer.

Molecular weight distribution (MWD) as measured by Mw/Mn of synthetic lubricants, and their shear stability as measured by CEC L-45-A-99 Taper Roller Bearing (TRB) test at 100 hrs, as well as a pour point measured by ASTM method D5950, are important attributes of a lubricant base stock. As demonstrated in Table 3 (examples 6 and 7) multiple recycle of unconverted monomers does not affect these key properties.

Laboratory experiments were also carried out in a semi-batch reaction mode to demonstrate the feasibility of unconverted monomer recycle. Metallocene catalyst system used in these experiments was the same as the one used in previously described examples 1 through 7. In a semi-batch reaction mode the olefin feed and metallocene catalyst system are continuously added for a period of time to a stirred reactor which is maintained at a desirable reaction temperature. After the addition of reactants and catalyst is completed, the reaction mass is held at the same temperature for additional period of time to increase olefin conversion. At the end of hold period the reaction mass is quenched by adding water. Subsequently the quenched reaction mass is distilled to remove unconverted monomer; and further processed. In semi-batch reaction mode experiments the reactants add time ranged from 0.5 hrs to 6 hrs, while the hold time varied between 0.0 hrs to 6.0 hrs. Reaction temperature ranged from 30° C. to 100° C. Metallocene catalyst loading ranged from 1 g of catalyst per 10,000 g of olefin feed to 1 g of catalyst per 250,000 g of olefin feed.

Result from semi-batch experiments are shown in Table 4, Examples 8 through 11. These experiments used different olefin feeds and the same catalyst system. In examples 8 and 9 olefin used was 1-decene. Experiment 8 was conducted with fresh feed, while Experiment 9 used as a feed 100% of unconverted monomers generated in Experiment 8. This set of experiments, 8 and 9, show that while olefin utilization was improved (Experiment 9) by recycling unconverted monomers, product viscosity could not be maintained because polymerization temperature was held the same.

including feeds comprising one or more of 1-butene, 1-hexene, 1-octene, 1-decene, 1-dodecene, and 1-tetradecene, 1-hexadecene.

In described above examples, an olefin feed comprising of at least one of C4 through C16 olefins containing ~1 to 6 wt % inerts is fed to a catalytic reactor containing the single site metallocene supported therein, following by a distillation process. PAO product is taken off as bottoms and unreacted monomer is taken overhead. In the first pass, without recycle, typically about 50 to 95 wt % of the product is trimer and above (such as C26+ PAO) and the rest is unreacted monomer and undesirable dimer.

Furthermore, it has been found advantageous that in conjunction with partial recycle, the temperature of the reaction be reduced a few degrees (e.g., from about 60° C. to about 55° C.) in order to get the same viscosity product using the mixed alpha-olefin feed with recycle as is achieved using the same catalyst but with fresh olefin feed and without recycle Kinematic Viscosity (K.V.) were measured according to ASTM D445 at the temperature indicated (e.g., 100° C. or −40° C.).

Viscosity Index (VI) was determined according to ASTM D-2270.

Noack volatility was determined according to the ASTM D5800 method, with the exception that the thermometer calibration is performed annually rather than biannually.

Pour point was determined according to ASTM D5950.

TABLE 4

Semi-Batch Mode Processing

| Example # | 8 | 9 | 10 | 11 |
|---|---|---|---|---|
| Feed | Fresh 1-decene | Recycled monomers from Example 8 | Fresh $C_6/C_{10}/C_{14}$ 25 wt %/60 wt %/15 wt % | Recycled monomers from Example 10 |
| Reaction Temperature, ° C. | 70 | 70 | 65 | 60 |
| Feed Add Time, hrs | 2.0 | 2.0 | 2.0 | 2.0 |
| Reaction Hold Time, hrs | 2.0 | 2.0 | 2.0 | 2.0 |
| Metallocene Catalyst Loading g of feed/g of cat | 100,000 | 100,000 | 100,000 | 100,000 |
| Total Reaction Time, hrs | 4.0 | 4.0 | 4.0 | 4.0 |
| % Conversion | 93.0 | 82.8 | 93.0 | 73.0 |
| % Lube Selectivity | ~98 | ~98 | ~98 | ~98 |
| Olefin Utilization, % | 93 | 97.1 | 93 | 95.3 |
| Hydrogenated Lube Property | | | | |
| KV@100° C., cSt | 115.2 | 72.9 | 144.0 | 152.0 |
| KV@40° C., cSt | 1023 | 611 | 1521 | 1583 |
| VI | 214 | 199 | 205 | 210 |
| PP | −30 | −33 | −33 | −33 |

Examples 10 and 11 were conducted with blended olefin feed C6/C10/C14 (25 wt %/60 wt %/15 wt %). Experiment 10 was made with fresh olefin feed only. Experiment 11 used as a feed 100% of unconverted monomers generated in Experiment 10. This set of experiments, 10 and 11, demonstrates that by using unconverted monomers in the feed and lowering polymerization temperature (Experiment 11), a product with the same viscosity as the one made with fresh feed only could be produced while simultaneously improving olefin feed utilization.

Described above Examples 1 to 3 demonstrate that coupling CSTR processing with metallocene catalysts produces products with very narrow MWD with significantly improved shear stability. In addition, these examples show that the improvement is not limited to pure 1-decene as feed, but also applies to wide range of mixed alpha-olefins as feed, Oligomer distribution was determined by using the Hewlett Packard (HP) 5890 Series II Plus GC, equipped with flame ionization detector (FID) and capillary column.

Unless stated otherwise herein, the meanings of terms used herein shall take their ordinary meaning in the art; and reference shall be taken, in particular, to Synthetic Lubricants and High-Performance Functional Fluids, Second Edition, Edited by Leslie R. Rudnick and Ronald L. Shubkin, Marcel Dekker (1999). This reference, as well as all patents and patent applications, test procedures (such as ASTM methods and the like), and other documents cited herein are fully incorporated by reference to the extent such disclosure is not inconsistent with this invention and for all jurisdictions in which such incorporation is permitted. Note that Trade Names used herein are indicated by a ™ symbol or ® symbol, indicating that the names may be protected by certain trademark rights, e.g., they may be registered trademarks in various jurisdictions. Note also that when numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein.

What is claimed is:

1. A process to prepare a PAO base stock characterized by a Kinematic Viscosity (K.V.) measured according to ASTM D445 at 100° C. of between 3 cSt and 10,000 cSt, comprising a step of contacting a single-site metallocene catalyst system with a feedstock comprising one or more fresh monomers selected from $C_4$ to $C_{18}$ alpha olefins and a recycled stream comprising un-reacted alpha-olefins, wherein said feedstock in said contacting step comprises 1 to 30% recycled un-reacted alpha-olefin, on a weight basis of the total olefin feed, and wherein said recycled stream is generated from the reactor effluent after separation from catalyst components and a lubricant-range PAO of at least $C_{26}$, wherein said process includes a purge in the amount of 1.0 wt % up to 80 wt % of said recycled stream, and the polymerization temperature is reduced by up to 5° C. after the recycled stream is first introduced into the reactor.

2. The process of claim 1, wherein said purge consists of 5 wt % to 60 wt % of said recycled stream.

3. The process of claim 1, wherein said purge consists of 10 wt % to 50 wt % of said recycled stream.

4. The process according to claim 1, wherein said PAO base stock is characterized by a $KV_{100}$ of greater than 3 cSt to about 3,000 cSt and a shear stability as tested by TRB at 20 hrs of less then 4% viscosity change, wherein said contacting occurs in a continuously stirred tank reactor (CSTR).

5. The process according to claim 1, wherein said PAO base stock is characterized by a $KV_{100}$ of greater than 3 cSt to about 1,000 cSt.

6. The process according to claim 1, wherein said PAO base stock is characterized by a $KV_{100}$ of greater than 3 cSt to about 700 cSt.

7. The process according to claim 4, wherein said PAO base stock is characterized by a $KV_{100}$ of greater than 3 cSt to about 150 cSt and a TRB of 20 hrs of less than 3% viscosity change.

8. The process according to claim 4, wherein said PAO base stock is characterized by a $KV_{100}$ of greater than 20 cSt to about 200 cSt and a TRB of 20 hrs of less than 2% viscosity change.

9. The process according to claim 4, wherein said PAO base stock is characterized by a $KV_{100}$ of greater than 200 cSt to about 300 cSt and a TRB of 100 hrs of less than 4% viscosity change.

10. The process according to claim 1, characterized by a product having a pour point lower than or equal to a product produced by the same reaction under the same conditions but without unreacted monomer recycle.

11. The process according to claim 1, characterized by a product having a pour point lower than or equal to a product produced by the same reaction under the same conditions, including monomer recycle, but without purge of said monomer recycle.

12. The process according to claim 1, characterized by a product having a pour point lower than or equal to a product produced by the same reaction under the same conditions but utilizing only fresh olefin feed.

13. The process according to claim 1, characterized by a utilization of olefin feed of at least 50 wt %.

14. The process according to claim 1, wherein said contacting occurs in the presence of $H_2$.

15. The process according to claim 1, wherein said contacting occurs in the absence of $H_2$.

16. The process according to claim 1, further comprising a step of obtaining a PAO product characterized by a Bromine number above 2 and hydrogenating said PAO product to obtain a hydrogenated product characterized by a Bromine number below 2.

17. The process according to claim 1, wherein said feedstock to said contacting step comprises fresh olefin feed and recycled olefins, said recycled olefins comprising olefin monomers and olefin dimers, and wherein said olefin monomers of the recycled olefins comprise at least 20 wt % linear internal olefins, di-, and tri-substituted olefins.

18. The process according to claim 1, wherein said process is a continuous, semi-batch or batch process.

19. The process according to claim 1, wherein the recycled stream generated from the reactor effluent contains 5 to 40 wt % of the unreacted fresh feed olefin.

20. The process according to claim 1 wherein the polymerization temperature is reduced by 3° C. to 5° C.

* * * * *